US 6,588,172 B2

(12) United States Patent
Porter

(10) Patent No.: US 6,588,172 B2
(45) Date of Patent: *Jul. 8, 2003

(54) BUILDING PANELS WITH PLASTIC IMPREGNATED PAPER

(76) Inventor: William H. Porter, 4240 N. 136th Ave., Holland, MI (US) 49423

( * ) Notice: Subject to any disclaimer, the term of this patent is extended or adjusted under 35 U.S.C. 154(b) by 0 days.

This patent is subject to a terminal disclaimer.

(21) Appl. No.: 09/931,226

(22) Filed: Aug. 16, 2001

(65) Prior Publication Data

US 2003/0033774 A1 Feb. 20, 2003

(51) Int. Cl.$^7$ .................................................. E04C 2/34
(52) U.S. Cl. ..................... 52/794.1; 52/309.5; 52/309.8; 52/309.15; 52/506.05; 52/761.1
(58) Field of Search .................... 52/309.1, 309.4–309.8, 52/309.13, 309.14, 408, 409, 506.05, 794.1, 796.1, 793.1, 761.1, 309.5

(56) References Cited

U.S. PATENT DOCUMENTS

| | | |
|---|---|---|
| 1,474,657 A | 11/1923 | Walper |
| 3,496,058 A | 2/1970 | Schroter et al. |
| 3,692,620 A | 9/1972 | Schmidt et al. |
| 3,753,843 A | 8/1973 | Hutchison |
| 3,967,016 A * | 6/1976 | Schneller et al. ........... 427/424 |
| 4,004,387 A | 1/1977 | Ellingson |
| 4,032,689 A | 6/1977 | Johnson et al. |
| 4,283,898 A | 8/1981 | Claver |
| 4,443,988 A | 4/1984 | Coutu, Sr. |
| 4,726,973 A | 2/1988 | Thompson |
| 4,865,912 A | 9/1989 | Mitsumata |
| 4,961,298 A | 10/1990 | Nogradi |
| 4,964,933 A | 10/1990 | Hata et al. |
| 5,081,810 A | 1/1992 | Emmert |
| 5,224,315 A | 7/1993 | Winter, IV |
| 5,269,109 A | 12/1993 | Gulur |
| 5,345,738 A | 9/1994 | Dimakis |
| 5,509,242 A | 4/1996 | Rechsteiner et al. |
| 5,519,971 A | 5/1996 | Ramirez |
| 5,573,829 A | 11/1996 | Decker |
| 5,641,553 A | 6/1997 | Tingley |
| 5,755,068 A | 5/1998 | Ormiston |
| 5,953,883 A | 9/1999 | Ojala |

* cited by examiner

Primary Examiner—Carl D. Friedman
Assistant Examiner—Yvonne M. Horton
(74) Attorney, Agent, or Firm—Emrich & Dithmar

(57) ABSTRACT

A generally planar, structural insulated panel for building construction includes a pair of outer facings disposed on opposed surfaces of a plastic foam core. One of the outer facings is of a gypsum or cementous composite for use on the panel's inner surface, while the other outer facing is of oriented strand board (OSB) or other conventional building material which forms the panel's outer surface. Disposed between and laminated to the inner surface of the gypsum or cementous composite facing and the plastic foam core by a conventional bonding agent is a sheet of paper impregnated with urethane or polyisocyanurate plastic. The impregnated sheet of paper serves as a vapor barrier near the panel's inner surface to prevent moisture from permeating from the warm interior of the structure through the plastic foam insulation to the outside. The plastic impregnated sheet of paper bonded to the foam core and the panel's inner facing also substantially increases the tensile strength of the panel to withstand large transverse loads.

10 Claims, 4 Drawing Sheets

BUILDING PANELS WITH PLASTIC IMPREGNATED PAPER

FIELD OF THE INVENTION

This invention relates generally to structural insulated panels used in building construction and is particularly directed to a structural insulated panel having a plastic foam core and a pair of opposed outer facings, and further including a plastic impregnated sheet of paper laminated between an outer facing of the panel and its insulating foam core.

BACKGROUND OF THE INVENTION

Most houses are stick built, i.e., constructed of 2× dimensional structural lumber members and nails. This approach to building construction is slow and manpower intensive, requires a large supply of a limited commodity, and affords a limited number of structural shapes.

Structural Insulated Panels (SIPs) are increasingly being used in building construction as an alternative to the stick built approach. SIP construction employs two rigid faces on either side of a light insulating foam core. High strength bonding of the outer facings to the inner core forms a structural I-beam in the form of flat panels which are typically joined together by lumber and nails. The outer, opposed panel faces are typically formed from conventional building materials such as gypsum or cementous composites, plywood, oriented strand board (OSB), drywall, or other rigid construction boards from ¼" to ¾" thick. Panels formed from the aforementioned materials suffer primarily from two limitations. One shortcoming of these panels is their limited tensile strength which renders these types of panels unable to accommodate large transverse loads. Another limitation relates to the inability of these types of panels to environmentally isolate one side of the panel from the other. For example, panel facings comprised of the aforementioned materials as well as the inner foam core of the panel are not weather resistant and permit moisture to travel between the outer panel facings. This limits the use of these types of panels in outer walls and roofs in many building structures such as houses and office buildings.

The prior art discloses various approaches for increasing the strength of these structural insulated panels. One approach incorporates wood members in the panel to increase its strength. But panels strengthened in this manner are subject to moisture degradation and insect infestation when used on the outside of a structure. Applicant's U.S. Pat. No. 5,497,589 employs metal edges disposed about and securely attached to the panel's inner foam core and outer opposed facings affixed to the inner core. The metal strip around the peripheral edge of the panel increases the strength of the panel, eliminates the need for structural members such as studs which act as thermal conductors, and facilitates coupling between adjacent panels. Applicant's U.S. Pat. No. 5,628,158 increases the strength of joined panels by inserting a spline in facing grooved edges of connected panels. The spline includes an insulating core and a pair of outer facing metal strips extending the length of the spline. The metal-faced spline is affixed to the panel edges by means of a structural adhesive for securely connecting the two insulated panels. Still another approach to strengthening structural insulated panels is disclosed in applicant's allowed U.S. patent application Ser. No. 08/853,696, filed May 8, 1997, wherein metal strips are incorporated in the panel and are bonded to the insulating core and an outer facing. Another approach employs a metal facing on one or both surfaces of the structural insulated panel to increase panel strength and environmentally isolate one side of the panel from the other, but this substantially increases the cost of the panel and precludes use of the panel in many types of common structures.

Many structural insulated panels incorporate an aforementioned gypsum or cementous outer facing having a paper outer surface. The paper used on these panel facings is not treated, nor is it impregnated, and thus does not contribute to panel rigidity or strength. Most paper impregnation processes use plastics like phenolic which actually reduce the tensile strength of the paper making it impractical for use as a building material.

The present invention represents an improvement over the prior art by providing a low cost structural insulated panel having a plastic foam inner core and opposed outer facings comprised of conventional building materials which has a high tensile strength for withstanding large transverse loads and provides an environmental seal between its opposed inner and outer surfaces.

OBJECTS AND SUMMARY OF THE INVENTION

Accordingly, it is an object of the present invention to provide a high strength, weather- and insect-resistant structural insulated panel for building construction.

It is another object of the present invention to incorporate a laminated layer of plastic impregnated paper in a structural insulated panel to increase the panel's tensile strength and render the panel impervious to moisture.

Yet another object of the present invention is to increase the tensile strength of a gypsum or cementous sheet in a multi-layered structural insulated panel and to render the panel impervious to moisture by laminating a plastic impregnated sheet of paper to the inner surface of the gypsum or cementous sheet and to the panel's inner foam core.

Still another object of the present invention is to provide a high strength structural panel for building construction which is fire- and moisture-resistant and is thus capable of serving as a vapor barrier.

This invention contemplates a reinforced structural insulated panel arrangement comprising: a generally flat insulating core; first and second outer facings attached to opposed lateral surfaces of the insulating core, wherein the first outer facing is comprised of a gypsum or cementous composite; and a first sheet of plastic impregnated paper disposed between and bonded to the insulating core and the first outer facing for increasing tensile strength of the panel and forming a moisture barrier between the first and second outer facings of the panel.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENTS

Figure 1:
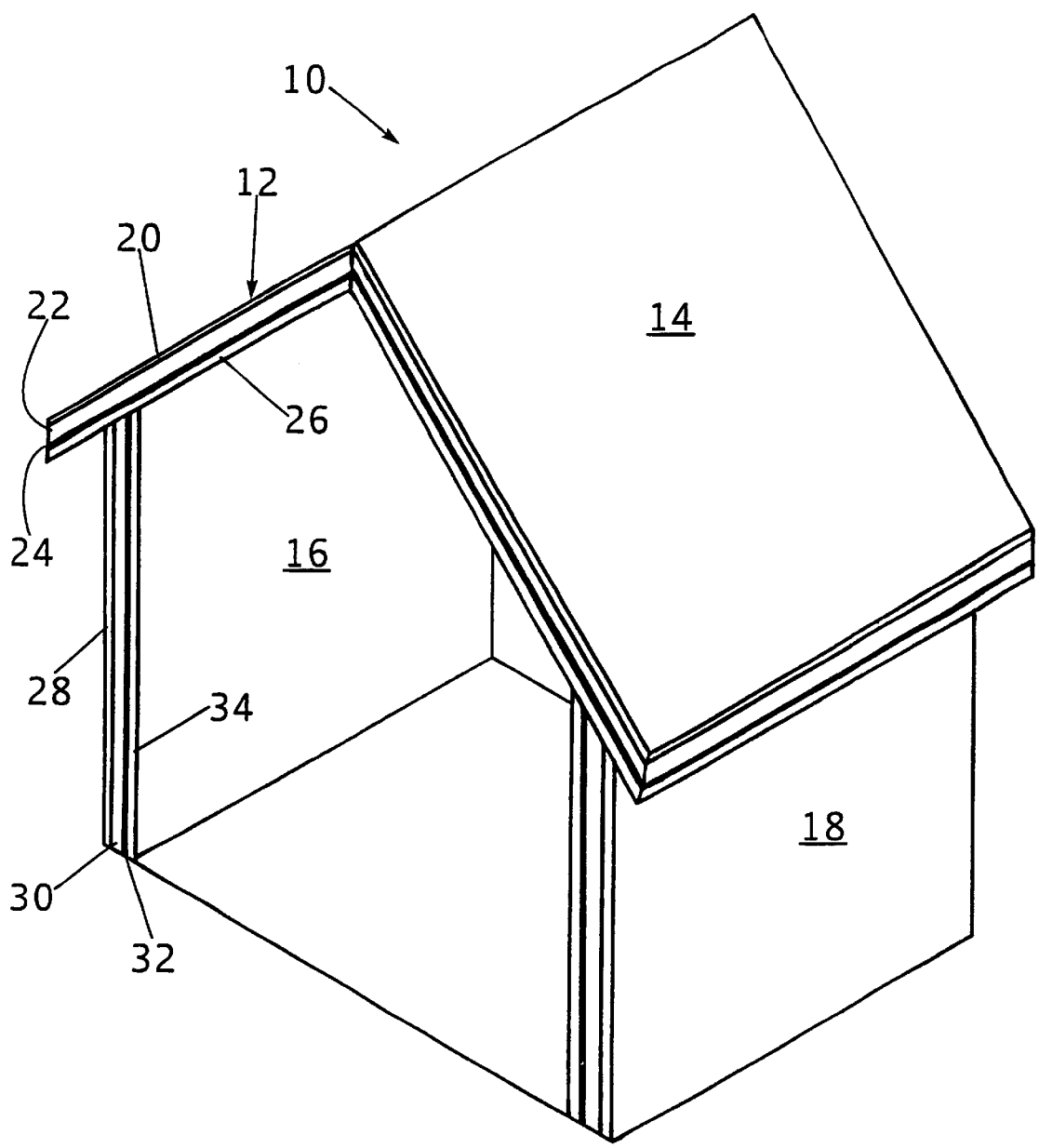
FIG. 1 is a simplified perspective view of a building structure incorporating structural insulated building panels with plastic impregnated paper in accordance with the principles of the present invention.

Referring to FIG. 1, there is shown a simplified perspective view of a building structure 10 incorporating building panels with plastic impregnated paper in accordance with the present invention. Building structure 10 includes first and second roof decks, or panels, 12 and 14. Building structure 10 further includes first and second wall panels 16 and 18. The roof decks and wall panels are joined together by conventional means such as nails and screws. The first roof deck 12 includes an exterior facing 20, an interior facing 26, and a plastic foam insulating core 22 disposed between and attached to the two outer facings. Conventional means such as an adhesive in the form of mastic or epoxy cement may be used to join the two outer panels to the plastic foam core in the building panel. The first roof deck 12 further includes a sheet of plastic impregnated paper 24 disposed between and attached to the plastic foam core 22 and interior facing 26. A conventional adhesive may also be used in attaching the plastic impregnated paper sheet 24 to the panel's plastic foam core 22 and interior facing 26. The second roof deck 14 is of a construction similar to that of the first roof deck 12. The plastic foam insulating cores of these building panels are preferably comprised of expanded polystyrene or urethane. The adhesive used is preferably urethane cement or glue.

The first wall panel 16 also includes an exterior facing 28, an inner plastic foam insulating core 30, and an interior facing 34. Disposed between and attached to the plastic foam core 30 and interior facing 24 is a sheet of plastic impregnated paper 32 in accordance with the present invention. Each of the layers in the laminated first wall panel 16 is attached to an adjacent layer, or layers, by conventional means such as a high strength, commercially available adhesive. The second wall panel 18 is similar in construction and configuration to the first wall panel 16. In a preferred embodiment, the plastic impregnated paper sheets 24 and 32 are comprised of paper or box board impregnated with a urethane or polyisocyanurate plastic. This plastic impregnated paper is commercially available from Weyerhauser and is sold under the trade name of P-Cell. The plastic impregnated paper sheets 24, 32 respectively disposed in the first roof deck 12 and the first wall panel 16 offer several advantages. For example, the plastic impregnated paper sheets serve as a vapor barrier near the inside surface of an exterior wall or roof deck to prevent moisture from entering from the inside of the building structure and passing through the panel's plastic foam core to the panel's outer facing and wall cladding, if present. Moisture passing through the structural insulated panel has two undesirable consequences. First, it results in a loss of moisture from the interior of the building structure 10 which reduces the comfort level of those occupying the building structure. In addition, the introduction of moisture into the interior of the building panel will eventually result in degradation of the panel structure. Another advantage of the plastic impregnated paper sheet is that it substantially increases the tensile strength of the structural insulated panel. The plastic impregnated paper sheet introduced between and adhered to the panel's inner foam core and an outer facing permits the panel to withstand large transverse loads when the plastic impregnated paper sheet/outer facing side of the panel is in tension. For example, by positioning the plastic impregnated paper sheet 24 between and adhering it to the first roof deck's plastic foam core 22 and interior facing 26, the first roof deck 12 can accommodate substantially larger vertical loads such as from the weight of snow than a panel without the plastic impregnated paper sheet. The strength of the plastic impregnated paper sheet 24 may be further increased by impregnating the paper sheet with fiberglass.

Figure 2:
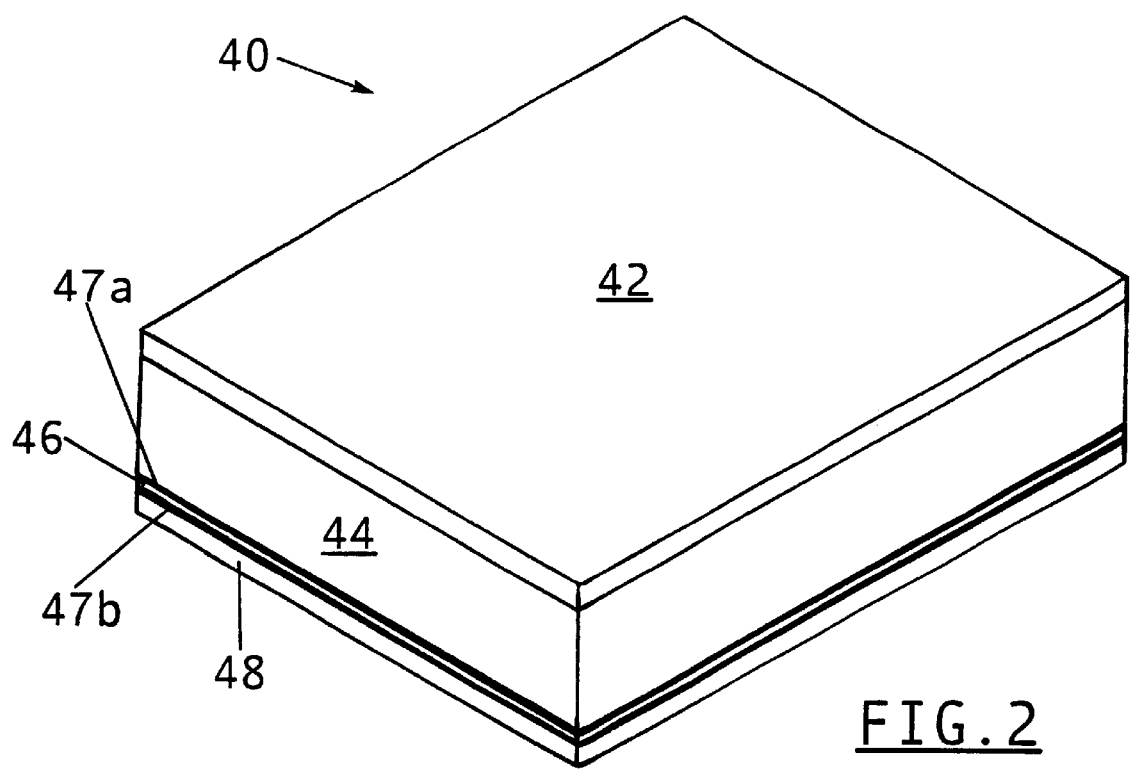
FIG. 2 is a perspective view of one embodiment of a structural insulated building panel with plastic impregnated paper in accordance with the present invention.

Referring to FIG. 2, there is shown a perspective view of a structural insulated panel 40 in accordance with one embodiment of the present invention. The structural insulated panel 40 includes a first outer facing 42, a plastic foam core 44 and a second opposed outer facing 48. Disposed between and attached to one surface of the panel's plastic foam core 44 and its second outer facing 48 is a sheet of plastic impregnated paper 46. Adhesive layers 47a and 47b disposed on opposed surfaces of the sheet of plastic impregnated paper 46 securely attach the sheet to the panel's plastic foam core 44 and its second outer facing 48, respectively. Structural insulated panel 40 is preferably positioned in a building structure with its first outer facing 42 facing outwardly and its second outer facing 48 facing inwardly relative to the building structure. In this orientation, the panel's first outer facing 42 is comprised of oriented strand board (OSB), a gypsum or cementous composite material, plywood, drywall, or other conventional building material. The panel's second outer facing 48 is preferably comprised of gypsum or cementous composite.

Figure 3:
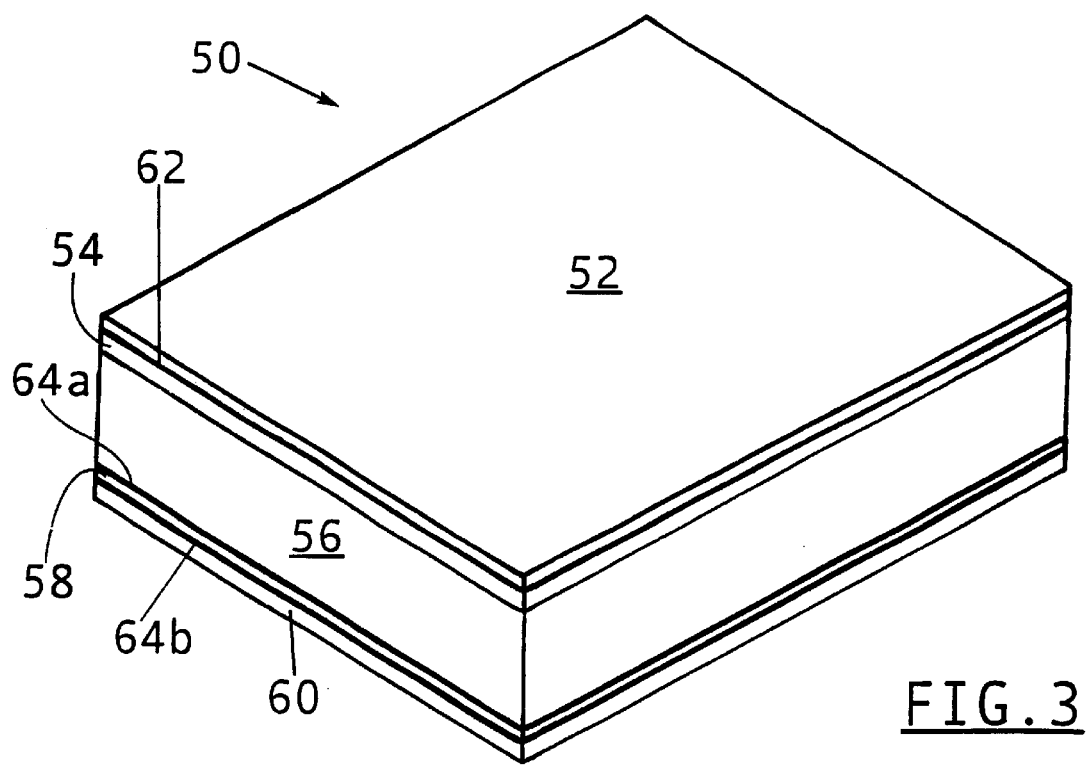
FIG. 3 is a perspective view of another embodiment of a structural insulated building panel with plastic impregnated paper in accordance with the present invention.

Referring to FIG. 3, there is shown a perspective view of another embodiment of a structural insulated panel 50 in accordance with the principles of the present invention. Structural insulated panel 50 includes opposed first and second outer facings 54 and 60. Disposed between the first and second outer facings 54, 60 is the panel's insulating plastic foam core 56. Disposed on the first outer facing 54 is a first sheet of plastic impregnated paper 52. The first sheet of plastic impregnated paper 52 is securely attached to the panel's first outer facing 54 by means of an adhesive layer 62. Disposed between the panel's plastic foam core 56 and its second outer facing 60 is a second sheet of a plastic impregnated paper 58. The plastic impregnated paper sheet 58 is securely affixed to the panel's plastic foam core 56 and second outer facing 60 by means of first and second adhesive layers 64a and 64b, respectively. The first sheet of plastic impregnated paper 52 on the outer surface of the structural insulated panel 50 serves as a weather-resistant, high strength finish for the first outer facing 54 which may be a gypsum or cementous composite material. The first sheet of plastic impregnated paper 52 may be painted for additional protection. The second sheet of plastic impregnated paper 58 attached to the panel's insulating foam core 56 and second outer facing 60 prevents moisture from passing from the panel's inner surface to its outer surface through the plastic foam core as in the previously described embodiment. Second outer facing 60 may be wood fiber or a gypsum or cementous composite. The first and second sheets of plastic impregnated paper 52, 58 provide the structural insulated panel 50 of FIG. 3 with even more tensile strength than the structural insulated panel 40 of FIG. 2 which incorporates a single sheet of plastic impregnated paper 46.

Figure 4A:
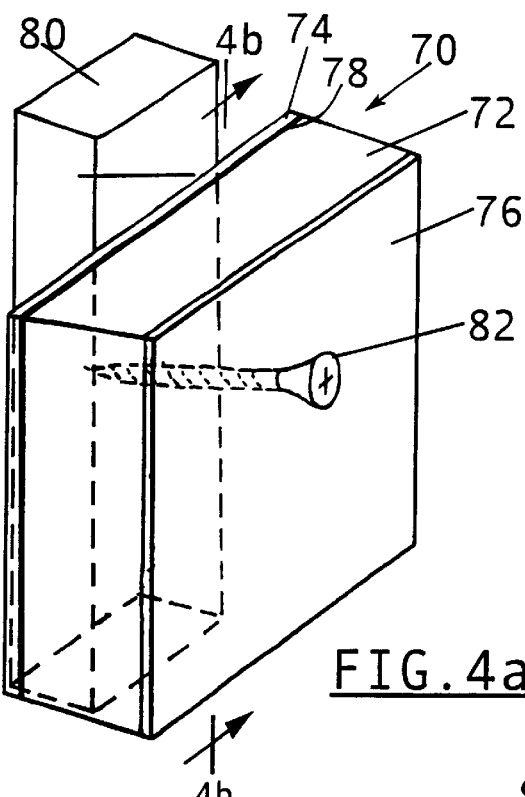
FIG. 4a is a partial perspective view of a structural insulated building panel in accordance with the present invention showing a screw inserted through the panel for securing the panel to a support member.
Figure 4B:
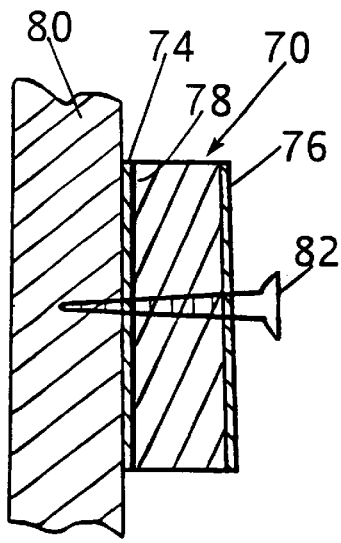
FIG. 4b is a sectional view of the structural insulated building panel and screw combination shown in FIG. 4a taken along site line 4b—4b therein.

Referring to FIG. 4a, there is shown a partial perspective view of a structural insulated panel 70 in accordance with the present invention showing a screw 82 inserted through the panel for securing the panel to a support member 80. FIG. 4b is a vertical sectional view of the panel coupling arrangement shown in FIG. 4a taken along site line 4b—4b therein. As in the previously described embodiments, structural insulated panel 70 includes first and second outer facings 74 and 76 and a plastic foam core 72 disposed therebetween. Structural insulated panel 70 further includes a sheet of plastic impregnated paper 78 disposed between and attached to the panel's plastic foam core 72 and its first outer facing 74. A conventional adhesive is used to securely affix the sheet of plastic impregnated paper 78 to the panel's plastic foam core 72 and first outer facing 74 as previously described. Screw 82 is inserted through the panel's outer facings and the plastic foam core 72 and into support member 80. Support member 80 may be a wall stud 80 or a ceiling or roof rafter which is typically comprised of wood, but may also be of metal. The plastic impregnated paper sheet 78 substantially increases the extent of engagement of the screw 82 with the structural insulated panel 70. The plastic impregnated paper sheet 78 thus provides for the more secure attachment of the structural insulated panel 70 to support member 80 than in the case of a panel merely have a gypsum or cementous outer facing in abutting contact with the support member.

Figure 5A:
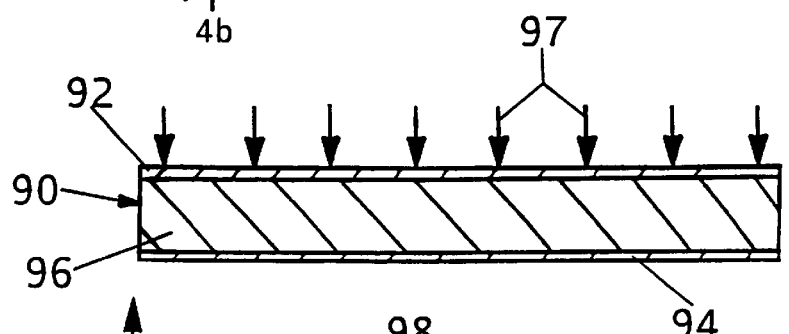
FIG. 5a is a simplified sectional view of a horizontal building panel to which a uniform vertical load is applied.

Referring to FIG. 5a, there is shown a simplified sectional view of a prior art structural insulated panel 90 to which a uniform vertical load is applied. The structural insulated panel 90 includes first and second opposed outer facings 92 and 94 and an insulating foam core 96 disposed between and attached to the two outer facings. Shown in the figure are a plurality of spaced arrows 97 representing a uniform force applied to the structural insulated panel 90.

Figure 5B:
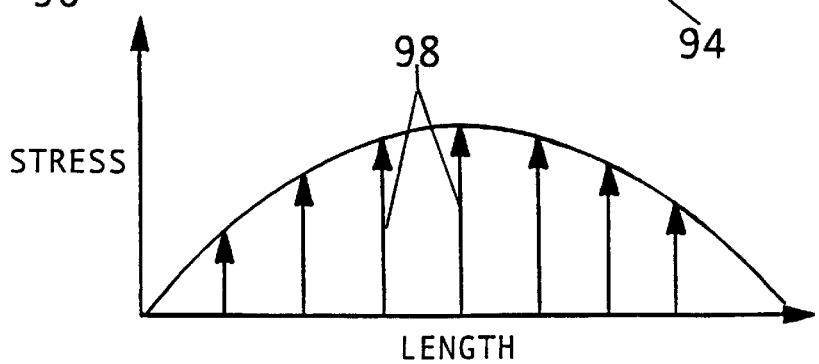
FIG. 5b is a graphic representation of the stress applied to the building panel shown in FIG. 5a along the length of the panel.

Referring to FIG. 5b, there is shown a graphic representation of the stress exerted on the second outer facing 94 of the structural insulated panel 90 shown in FIG. 5a. In FIG. 5a, the structural insulated panel 90 is supported at respective ends thereof, although this is not shown in the figure for simplicity. In FIG. 5b, the magnitude of the stress exerted on the panel's second outer facing 94 is shown along the length of the structural insulated panel 90. From the figure, it can be seen that the stress applied to the structural insulated panel's second, or lower, outer facing 94 is greatest at the center of the panel and decreases in proceeding toward its opposed ends. Arrows 98 represent the stress exerted on the structural insulated panel 90, with the length of the arrows being proportional to the magnitude of the stress exerted on the panel's second outer facing 94.

Figure 5C:
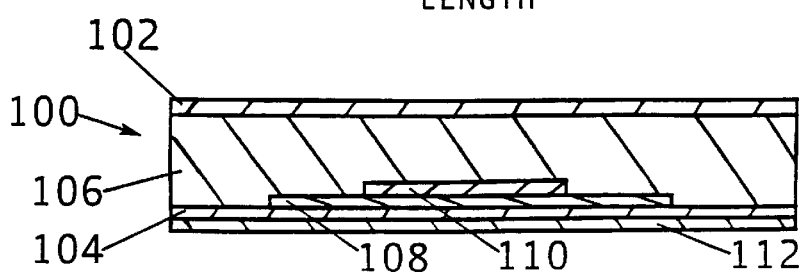
FIG. 5c is a sectional view of another embodiment of a structural insulated building panel with plastic impregnated paper in accordance with the present invention, wherein the panel has been strengthened to withstand greater transverse forces.
Figure 6:
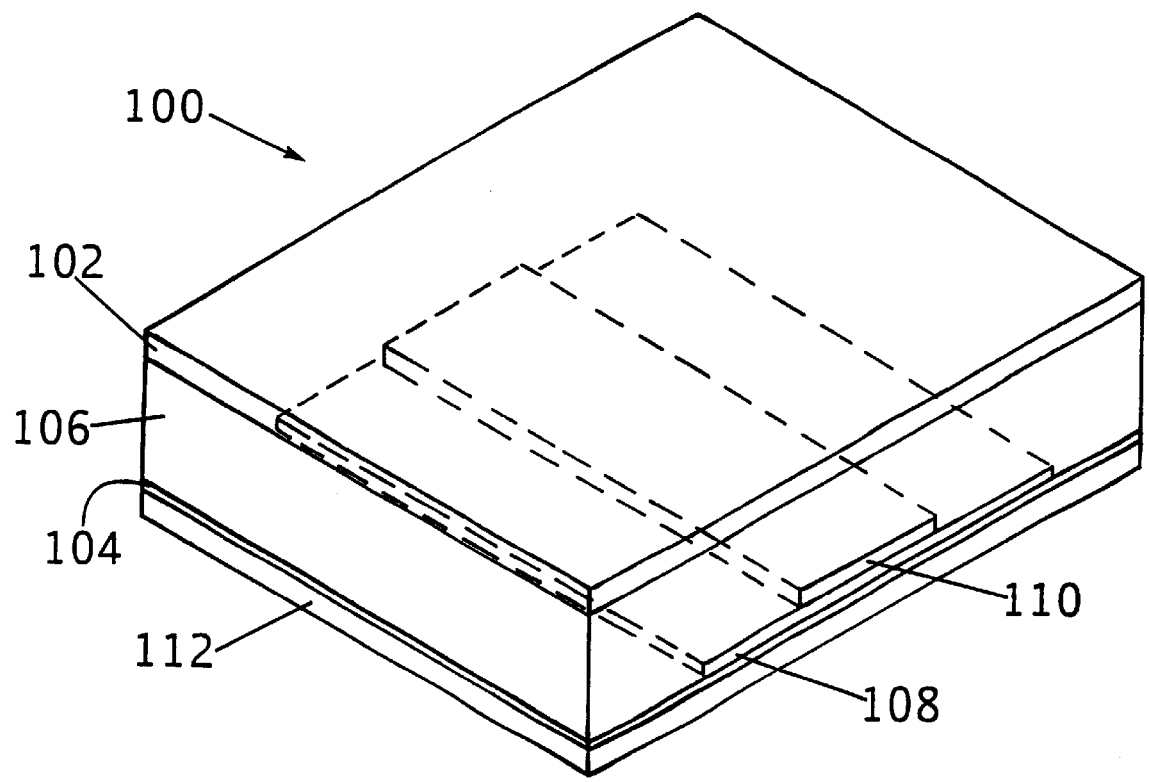
FIG. 6 is a perspective view shown partially in phantom of the structural insulated building panel shown in FIG. 5c.

Referring to FIG. 5c, there is shown a sectional view of another embodiment of a structural insulated panel 100 in accordance with the principles of the present invention. FIG. 6 is a perspective view, shown partially in phantom of the structural insulated panel 100 shown in FIG. 5c. Structural insulated panel 100 includes first and second outer facings 102 and 112 and an insulating foam core 106 disposed between the two outer facings. The inner surface of the first outer facing 102 is affixed to the panel's insulating foam core 106 by means of a conventional adhesive as previously described. This adhesive layer as well as other adhesive layers described below in the structural insulated panel 100 are not shown in the figures for simplicity.

The structural insulated panel 100 further includes first, second and third plastic impregnated paper sheets 104, 108 and 110. The first plastic impregnated paper sheet 104 is bonded to the inner surface of the panel's second outer facing 112. The second plastic impregnated paper sheet 108 is bonded to the inner surface of the first plastic impregnated paper sheet 104, while the third plastic impregnated paper sheet 110 is bonded to the inner surface of the second plastic impregnated paper sheet 108. Each of the three plastic impregnated paper sheets is also bonded to the panel's insulating foam core 106. Again, a conventional adhesive as previously described may be used to securely bond each of the plastic impregnated paper sheets to the panel's insulating foam core 106 and to bond the first plastic impregnated paper sheet 104 to the inner surface of the panel's second outer facing 112. The first, second and third plastic impregnated paper sheets 104, 108 and 110 are arranged in a layered array within the structural insulated panel 100, where the thickness of the layers is greatest at the location of greatest stress exerted on the panel's second outer facing 112. The tensile side of the structural insulated panel 100 is thus substantially reinforced in strength by means of the layered plastic impregnated paper sheets which are sized to conform with the areas of maximum stress on the panel, while minimizing the amount of plastic impregnated paper sheet material required for maximum strength. The insulating foam core 106 is sufficiently deformable so as to conform with and intimately engage the three plastic impregnated paper sheets 104, 108 and 110 within the structural insulated panel 100. In a preferred embodiment, the panel's first outer facing 102 is comprised of oriented strand board and faces outwardly, while the panel's second outer facing 112 is comprised of gypsum or cementous composite and faces inwardly.

Figure 7:
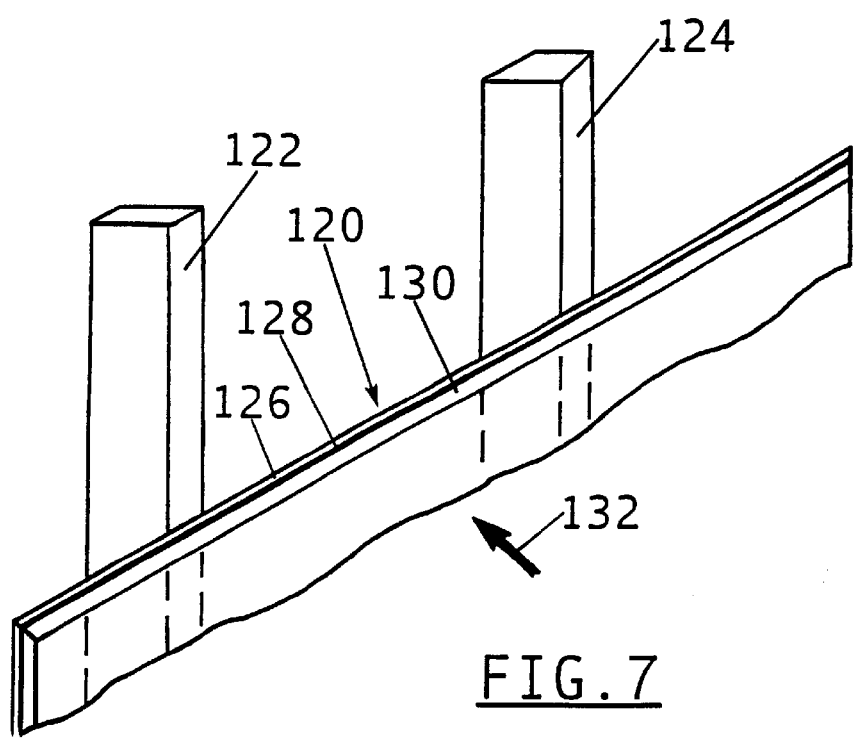
FIG. 7 is a partial perspective view showing the manner in which a structural insulated building panel in accordance with the present invention is attached to vertical studs.

Referring to FIG. 7, there is shown a partial perspective view illustrating the manner in which a building panel 120 in accordance with the present invention is attached to a pair of spaced vertical studs 122 and 124. Building panel 120 includes a plastic impregnated paper sheet 126 bonded to a gypsum composite facing 130 by means of an adhesive layer 128 disposed therebetween. A force applied to the building panel 120 in the direction of arrow 132 places the plastic impregnated paper sheet 126 under tension. The high strength plastic impregnated paper sheet 126 prevents the gypsum composite facing 130 from cracking upon the application of the force and greatly increases the strength of the building panel 120. Positioning the plastic impregnated paper sheet 126 on the side of the building panel 120 away from the side to which the force is applied substantially increases the tensile strength of the panel.

There has thus been shown a structural insulated panel comprised of an insulating foam core with opposed first and second outer facings each comprised of a conventional building material such as a gypsum or cementous composite or oriented strand board. A plastic impregnated paper sheet is disposed between and adhered to the panel's insulating foam core and one of its outer facings. The paper sheet is impregnated with urethane or polyisocyanurate plastic in a preferred embodiment which serves as a fire resistant vapor barrier near the panel's inner surface to prevent moisture from escaping from the warm interior of a building structure through the insulating foam core to the outside. The high strength plastic impregnated paper sheet also substantially increases the tensile strength of the panel to withstand large transverse loads. The strength of the panel may be further increased by also impregnating the paper sheet with fiberglass. A structural insulated panel in accordance with the present invention may include one or more such plastic impregnated paper sheets where panels of high strength are required. The plastic impregnated paper sheets may be layered and sized in accordance with the stress profile of the structural insulated panel to further increase the panel's tensile strength while employing the minimum required amount of plastic impregnated paper. The plastic impregnated paper sheet may be applied to a gypsum composite facing to substantially increase the strength of the facing and to environmentally isolate one side of the panel from the other.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A reinforced structural insulated panel arrangement comprising:

a generally flat insulating core;

first and second outer facings attached to opposed lateral surfaces of said insulating core, wherein said first outer facing is selected from the group comprising gypsum and cementous composites; and a first sheet of plastic impregnated paper disposed between and bonded to said insulating core and said first outer facing for increasing tensile strength of the panel and forming a moisture barrier between said first and second outer facings of the panel, wherein said first sheet of plastic impregnated paper is impregnated with a plastic selected from the group comprising urethane and polyisocyanurate.

2. The panel arrangement of claim 1 wherein said second outer facing is selected from the group comprising gypsum, cementous composites, plywood, oriented strand board, and drywall.

3. The panel arrangement of claim 2 further comprising first and second adhesive layers respectively disposed between said first sheet of plastic impregnated paper and said insulating core and said first outer facing for bonding said first outer facing to said insulating core.

4. The panel arrangement of claim 3 wherein said adhesive layers are selected from the group comprising urethane cement and glue.

5. The panel arrangement of claim 4 further comprising one or more support members and means for securely mounting the panel to said one or more support members, wherein said first outer facing is disposed immediately adjacent to or in contact with said one or more support members.

6. The panel arrangement of claim 5 wherein said mounting means includes one or more threaded screws inserted through the panel and into said one or more support members.

7. The panel arrangement of claim 1 wherein said insulating core is comprised of a plastic foam.

8. The panel arrangement of claim 7 wherein said plastic foam is selected from the group comprising expanded polystyrene and urethane.

9. The panel arrangement of claim 1 further comprising a second sheet of plastic impregnated paper disposed on and adhered to said second outer facing.

10. The panel arrangement of claim 9 further comprising an adhesive layer disposed between said insulating core and said second outer facing for bonding said second outer facing to said insulating core.

* * * * *